United States Patent
Benveniste

(10) Patent No.: US 7,693,175 B1
(45) Date of Patent: Apr. 6, 2010

(54) PRIORITIZED ACCESS IN A MULTI-CHANNEL MAC PROTOCOL

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 825 days.

(21) Appl. No.: 11/408,695

(22) Filed: Apr. 21, 2006

Related U.S. Application Data

(60) Provisional application No. 60/673,368, filed on Apr. 21, 2005.

(51) Int. Cl.
*H04L 12/413* (2006.01)

(52) U.S. Cl. .................. 370/447; 370/338; 370/450; 370/461; 370/462

(58) Field of Classification Search .......... 370/338, 370/445–448
See application file for complete search history.

(56) References Cited

U.S. PATENT DOCUMENTS

| 7,154,854 B1 * | 12/2006 | Zweig et al. ............. 370/236 |
| 7,164,671 B2 * | 1/2007 | del Prado et al. ......... 370/338 |
| 2003/0174665 A1 * | 9/2003 | Benveniste ............. 370/317 |

* cited by examiner

*Primary Examiner*—Derrick W Ferris
*Assistant Examiner*—Jose Villa
(74) *Attorney, Agent, or Firm*—Chapin IP Law, LLC; David W. Rouille, Esq.

(57) ABSTRACT

A method, apparatus and computer program product for providing a prioritized MAC protocol for a WLAN or wireless mesh using a time filtering technique wherein a time limit (Advanced Interval For Reservation or AIFR) is imposed on the time prior to the expiration of data channel's NAV when a data channel is considered 'almost idle'. The same AIFR limit applies to all CC-RTS of the same priority, and a higher priority CC-RTS will have a longer AIFR.

20 Claims, 4 Drawing Sheets

PRIORITIZED ACCESS IN A MULTI-CHANNEL MAC PROTOCOL

CROSS REFERENCE TO RELATED APPLICATIONS

The present application claims the benefit of U.S. Provisional Patent Application No. 60/673,368, filed on Apr. 21, 2005, which is incorporated herein by reference.

BACKGROUND

Growth in demand for WLANs is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables prioritized access to data channels is presented.

There is a single control (logical) channel at each control radio. This control channel is used by each control radio for time reservations on data channel(s) and for acknowledgements. The control channel does not change dynamically (fast).

Data channel(s) are the channels used by nodes to transmit data traffic. Each node may transmit always on the same data channel(s), or it may select a channel to transmit on demand (dynamic channel assignment).

In a wireless mesh network, the BSS Channel is the channel used by Mesh Access Points (MAPs) for transmissions within its BSS. For simplicity of presentation, it is assumed that a MAP uses different channels for mesh and BSS traffic. The CCC MAC protocol thus operates independently of the BSS MAC.

A TXOP (transmit opportunity) is a sequence of frames transmitted between a pair of nodes following a single contention for the channel. A Source node is the node initiating the TXOP, and the Destination node is the node receiving the TXOP.

A CC-RTS frame is the frame used by a node initiating a TXOP. The CC-RTS includes a source node; a destination node; a source node transmit channel; a Reservation Duration; and the Number of Frames in TXOP. The CC-RTS may further include additional information.

A CC-CTS frame is used by a node accepting a TXOP. The CC-CTS includes a source node; a source node transmit channel; a Duration; a Number of Frames in TXOP; and a Radio Counter. The CC-CTS may further include additional information.

If acknowledgement of receipt of transmission is desired, it can be sent either on the data channel or on the control channel. An acknowledgement on the control channel, known as the CC-ACK, identifies the individual frame in a sequence of frames that were received successfully (similar to 802.11e Group Ack). The CC-ACK includes the destination node; the source node; the source node transmit channel; and the TXOP frame receipt status. Sending a CC-ACK requires contention-based access to the control channel.

A node with frames to transmit to a neighbor sets its data radio to transmit on a permissible data channel, sends a CC-RTS on the control channel to the destination node, and waits for a CC-CTS, which contains the acceptance or denial of the channel reservation request for the selected/assigned data channel.

If the destination node receives the CC-RTS, it sends a CC-CTS. The CC-CTS will contain a zero in the Duration field if the destination node does not accept the reservation request in the CC-RTS. A CC-CTS is not sent if the Duration field or the Number of Frames field contains a zero in the CC-RTS.

If the destination node accepts the reservation request in the CC-RTS, the destination node sets a data radio to receive on the data channel assigned/selected by the source node. If the destination node receives the same CC-RTS in the SIFS plus tx time, it sends another CC-CTS and waits for a time interval equal to SIFS plus CC-CTS tx duration. If the CC-CTS has not arrived at the source node by the expiration of SIFS plus CC-RTS tx duration plus CC-CTS tx duration, it transmits within SIFS another CC-RTS on the control channel.

If the CC-CTS is received within a time interval comprising the SIFS plus the CC-RTS tx duration plus the CC-CTS tx duration by the source node, and the Duration field has a zero value, the source node sends a CC-RTS to the destination node with the Duration field set to zero. If the CC-CTS is received within a time interval equal to the SIFS plus the CC-RTS tx duration plus the CC-CTS tx duration by the source node, and the Duration field has been changed to a longer value, the source node sends a CC-RTS to the destination node with the Number of frames set to zero. If the CC-CTS has arrived within the time interval equal to the SIFS plus the CC-RTS tx duration plus the CC-CTS tx duration at the source node, and the Duration field has a non-zero value, the source node transmits the frame(s) in the TXOP. If so requested, the destination node will send an acknowledgement when the expected frames are received either on the data channel or on the control channel.

A NAV is defined as a time period a node must refrain from transmitting on a channel. The CC-RTS is a reservation request from the source, which is either granted or denied by the destination, and notice is sent to the source in the CC-CTS. The response contains the remaining reservation duration in order to notify the neighbors of the destination node. To avoid collisions, each node keeps a NAV for each channel, control and data, which is set according to the received reservation requests and responses. The NAV is the time period the node must refrain from transmitting on the channel, and is updated when a node receives a reservation request or a response to the reservation request.

Data traffic can be transmitted only when the selected data channel is idle. The reservation process may start before the data channel becomes idle. Contention for the control channel and the transmission of a CC-RTS and CC-CTS can take place while the data channel is still busy. Traffic prioritization is more effective if data channel reservations are made right before the data channel becomes idle.

SUMMARY

Conventional mechanisms such as those explained above suffer from a variety of deficiencies. One such deficiency is waiting for the data channel to become idle before a reservation is attempted for the channel. The data channel sits idle unnecessarily. While the reservation process may start before a data channel becomes available to transmit, look-ahead reservations (that is, reservations made well in advance)

could cause new high priority data traffic transmissions to wait for low priority transmissions if the latter generated a CC-RTS earlier.

Embodiments of the invention significantly overcome such deficiencies and provide mechanisms and techniques that provide prioritized access to data channels using a time filtering technique wherein a time limit (Advanced Interval For Reservation or AIFR) is imposed on the time prior to the expiration of data channel's NAV when a data channel is considered 'almost idle'. The same limit applies to all CC-RTS of the same priority, while a higher priority CC-RTS will have a longer AIFR.

In a particular embodiment, a method of providing prioritized access to data channels includes associating a AIFR time interval value with traffic to be transmitted by a source node to a destination node. The source node then transmits a look-ahead request (CC-RTS) for a data channel to use for a transmit opportunity (TXOP) at the AIFR time interval prior to expiration of a NAV of the data channel.

Other embodiments include a computer readable non-transitory medium having computer readable code thereon for providing prioritized access to data channels. The computer readable non-transitory medium includes instructions for associating an AIFR time interval value with traffic to be transmitted by a source node to a destination node. The computer readable non-transitory medium further includes instructions for transmitting by the source node a look-ahead request (CC-RTS) for a data channel to use during the transmit opportunity (TXOP) at the AIFR time interval prior to expiration of a NAV of the data channel.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides prioritized access to data channels as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing prioritized access to data channels as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
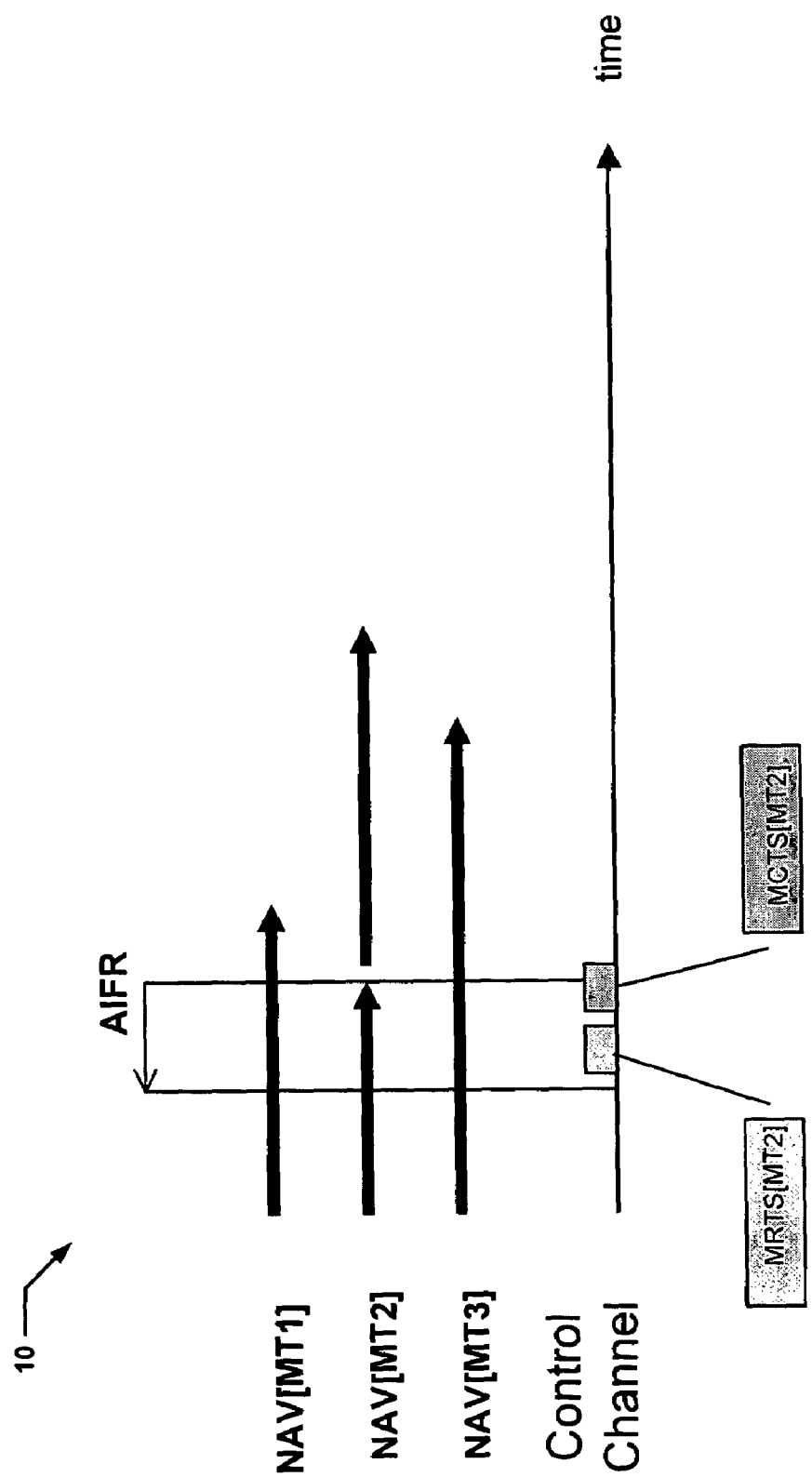
FIG. 1 is a timing diagram showing a control channel, three NAVs and a single AIFR in accordance with embodiments of the invention.

The present invention augments the Common Control Channel (CCC) protocol, a MAC protocol that extends the IEEE 802.11 distributed MAC. The CCC protocol defines a flexible channel access architecture that works with arbitrary mixtures of devices having one, one-and-a-half and several radios per node and accessing different numbers of channels. The CCC MAC is described in co-pending patent application titled "A Protocol For Wireless Multi-Channel Access Control", Ser. No. 11/393,127, filed Mar. 29, 2006, the disclosure of which is incorporated by reference herein.

CCC is based on distributed prioritized contention-based medium access, which reduces to the IEEE 802.11e EDCA MAC protocol for single-channel (and single-radio) devices. As such, it can be regarded as the natural multi-channel extension of EDCA. An additional radio (receiver) enables a station to monitor the activity on all channels carrying data traffic. Multiple radio devices are needed to accommodate high traffic concentration experienced in heavily used infrastructure BSSs or wireless mesh networks.

The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic. Both control and data can be sent onto the same single physical channel if a node is equipped with a single radio. The CCC protocol in the single radio case reduces to the distributed IEEE 802.11 MAC protocol, with some efficiency enhancements that are optional. If, on the other hand, a node has multiple radios, one radio—the 'control radio'—is tuned to the control channel. The remaining radio(s), called the 'data radio(s),' are tuned to data channels. Whereas the control radio may be used for control and data traffic, only data traffic may be sent through the data radio(s).

Reservations for transmission on the various data channels are made by exchanging control frames on the control channel. As extensions of the legacy RTS and CTS messages, the CC-RTS and CC-CTS are used to reserve a data channel for the time it takes to transmit a Transmission Opportunity (TXOP). A TXOP is a sequence of frames (and their respective acknowledgements) transmitted serially, immediately following a single successful contention-based channel access attempt, as for instance that prescribed by the IEEE 802.11e standard. The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Reservation of a data channel may commence shortly before the data channel becomes idle. The time when this occurs is discerned from the NAV for that channel, maintained by each node.

Both the source and destination node maintain a channel NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

Before describing the frame formats and handshake signalling it is important to define certain terms used in the description. A Source node is the node initiating a TXOP. A Destination node is the node receiving a TXOP.

The receiving node responds with a CC-CTS within a time interval of length SIFS. A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

A node may attempt transmission on a data channel once it has secured a reservation, provided the CCS indication on the data channel is idle. A node transmits mesh traffic on a data channel on which a reservation has been secured. Provided the CCS indication on the data channel is idle, the node will transmit after an idle PIFS or AIFS time interval, depending on the priority assigned to mesh traffic. Contention based access is used for transmission on the data channel in order to avoid collisions with independent WLAN(s) operating in the same area, on the same channel. In the event of a collision due to independent transmissions on the data channel, the node will attempt re-transmission using the rules of the CSMA/CA protocol. This allows a wireless mesh network to co-exist with WiFi users operating in the same area as the mesh.

Different frames utilized include a CC-RTS frame, used by a node initiating a TXOP. This frame includes several fields including a source node; a destination node; a source node transmit channel; a duration and a number of frames in TXOP. The CC-RTS includes (among other information), the data channel, a Duration field whose value will be at least the time needed for the TXOP transmission and the AIFR, and the number of frames in the TXOP. The CC-RTS is sent at a data rate that can be read by all nodes The destination node sends a CC-CTS in response within a time interval of SIFS. The reservation request is accepted if the destination node has a Channel_State idle indication for data channel designated by the source node, and the destination node has available radios to receive the transmission; i.e. the Radio Counter is non-zero. A CC-CTS frame is used by a node accepting a TXOP. The CC-CTS frame includes several fields including a destination node; a source node; a source node transmit channel; a Reservation Duration; a number of frames in TXOP; and a Radio Counter.

When a reservation request is accepted by the Destination node, the Reservation Duration field is adjusted and the number of frames in the TXOP is repeated in the CC-CTS sent by the destination node. The CC-CTS includes also the number of its radios that remain available to receive traffic—that is the Radio Counter. The destination node updates its NAV. When the reservation request is declined by the Destination node, the Reservation Duration field in the CC-CTS is set to zero, and the destination node does not update its NAV. The source node in that case sends another CC-RTS with a Reservation Duration field set to zero to cancel the NAV set by neighbors for the requested data channel; no CC-CTS is returned.

When the reservation is extended by the Destination node, the Reservation Duration field is greater than the adjusted value of the Reservation Duration field in the CC-RTS received. The source node in that case sends another CC-RTS with the Reservation Duration containing the extended value, and the Number of frames field set to zero to signal that no CC-CTS is needed as a reply.

The destination node may acknowledge the status of the transmitted sequence by sending a group acknowledgement, called CC-ACK, on the control channel either when all frames expected in a TXOP are received, regardless of errors, or after a time interval equal to {the value in the Duration field less the CC-ACK tx time less the AIFR} has expired. The frames received successfully will be identified in the CC-ACK. The channel of the TXOP transmission will be identified in the CC-ACK. The acknowledgement will be transmitted by contending for the control channel at the highest access priority—e.g. using the longest AIFR.

A CC-ACK frame identifies the individual frame in a sequence of frames that were received successfully. The CC-ACK frame includes a destination node; source node; and a TXOP frame receipt status.

A Transmit Opportunity (TXOP) is a sequence of frames that can be transmitted from one node (the source node) to another node (the destination node) with a single contention. A node with frames to transmit to another node will contend on the control channel using EDCA to reserve its assigned data channel for the transmission of the frame sequence.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contending at the highest access priority The source node will reserve its selected/assigned data channel for a TXOP by sending on the control channel a CC-RTS frame to the destination node. The Channel_State indication for the data channel must be idle when transmission starts on the data channel.

A node will maintain the Channel State for its own data channel and the data channels assigned to mesh neighbors. A Channel-State of 0 indicates that the data channel is idle. The Channel State of a data channel is determined by tracking on the control channel the reservations made for the data channel. A node will maintain the Radio Counter for the number of radios it has available to receive a mesh transmission. When a reservation is made to send mesh traffic to a node, its Radio Counter is decremented by 1. When the reservation expires, the Radio Counter is incremented by 1. For example, a node that has a single data radio, will set the Radio Counter field to 0 in the CC-CTS sent to accept a channel reservation.

Channel Reservation occurs when the source node reserve its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0.

Successful transmissions can be acknowledged, if desired. Nodes with a single radio (which transmit data on the control channel) can employ any of the acknowledgement forms provided by the 802.11 standard and its amendments. The same holds for nodes with two radios, one control radio and one data radio, except in certain situations when communicating with a node with multiple data radios.

Nodes may also transmit a group acknowledgement on the control channel, called the CC-Acknowledgement (CC-ACK), in order to notify the sender of the successful receipt of a TXOP. The CC-Ack would be used in order to avoid adjacent channel interference or in order to avoid exposed nodes.

CCC is backward compatible with existing 802.11 technologies. All nodes, that is both nodes using existing 802.11 technology and CCC compliant nodes, can communicate on the control channel through the existing 802.11 MAC protocol.

Prioritization of data traffic transmissions occurs during the reservation process on the control channel (i.e., during CC-RTS transmission to reserve a data channel for a TXOP).

A CC-CTS is transmitted on the control channel following receipt of a CC-RTS after a specified idle interval (e.g. SIFS).

Following the successful transmission of a TXOP, there are two choices in acknowledging the transmission, if acknowledgement is desired. Acknowledgement may be sent either on the data channel (similar to 802.11 and 802.11e), or on the control channel by sending a group acknowledgement, called CC-ACK (Control Channel-Acknowledgement). The CC-ACK identifies the individual frames in a sequence of frames that were received successfully. The CC-ACK is transmitted either when all frames expected in a TXOP are received, regardless of errors, or when the reservation expires. The advantage of using a CC-ACK optional feature relates to avoidance of adjacent channel interference and to the exposed node problem, which are discussed later.

Node control traffic will access the control channel with higher priority than the frames from independent WLANs. The reason for prioritizing control traffic is to expedite reservations for the data channels, thus enabling forwarded traffic to contend for the data channels on an equal footing with independent WLAN traffic. Prioritization of control traffic does not penalize independent traffic seriously because control traffic is light compared to mesh forwarded traffic (assuming that TXOPs are used).

If a CC-ACK is used for acknowledgement, it is assigned the highest priority access category. The same node may transmit a CC-RTS within a SIFS idle interval of sending a CC-ACK to acknowledge receipt of a TXOP. A CC-RTS and a CC-ACK may be piggybacked, provided they have the same destination.

The optional CC-ACK acknowledgement frame contains the following: Receiving node address; Forwarding node address; Transmit channel; and TXOP frame receipt status.

The data channel is reserved right before it becomes idle. Reserving a data channel well in advance of its becoming idle, possibly on a first-come-first-served basis, is not desirable when traffic is prioritized.

A node transmits data traffic on its assigned/selected channel, the data channel. A node monitors the control channel, where data traffic channel reservations and acknowledgement occur. The source node requests a reservation on a specific channel; the destination node accepts, extends, or declines the channel reservation request. A reservation request is declined if the destination node deems the requested channel busy, or if it has no available radios to receive the transmission. If the reservation request is declined, but the destination node has available radios, a different channel may be selected for reservation by the source node.

To access the control channel, a node will follow the rules of the prioritized contention-based channel access protocol, like the EDCA protocol of 802.11e. If other prioritization mechanism is employed a node may use CSMA/CA.

A node may attempt transmission on a data channel once it has secured a reservation, provided the CCA indication on the data channel is idle. In the event there is a collision due to transmissions on the data channel by stations or APs, the node will attempt re-transmission using the rules of contention based access (random backoff, count down and retransmit).

A node maintains a NAV for the data channel(s) it and its neighbors are allowed to use; in the absence of any restrictions, all channels are monitored. The NAV is determined by tracking on the control channel the reservations made for the data channel and the NAV setting requests received on the data channel while the data radio is tuned to that channel. A node will set a data radio to the data channel for which a reservation is sought no later than the time when it sends a CC-RTS or receives a CC-RTS on which it is the destination node and contains a nonzero value in the Reservation Duration field, if the CC-RTS is accepted. A node will transmit on a data channel if it receives for that channel a CC-CTS on which it is the source node and contains a nonzero value in the Reservation Duration field.

A node receiving a TXOP may transmit a CC-RTS within a SIFS idle interval following transmission of the acknowledgement on the control channel, provided that the requested data channel is available. A node may piggyback a CC-RTS to a CC-ACK, provided that the CC-RTS has the same destination as the CC-ACK, and provided that the requested data channel is available. To increase the probability that the data channel is available, the Reservation Duration field in a CC-RTS can be set to a value extended by a time increment no less than the CC-ACK transmission duration.

The time reserved on a data channel may not be sufficient to transmit the entire TXOP if the channel is noisy or collisions occur with independent users of the data channel. Most collisions with independent users are avoided as frames in a TXOP are transmitted within SIFS of one another. The value of the Reservation Duration field of the first or any frame in the TXOP can be set equal to the remaining duration of the TXOP. The legacy NAV of independent data channel users is updated according to this Duration value. A legacy RTS/CTS can be used on the data channel to avoid collisions with "hidden" independent users. A node could reserve initially more time than needed for the TXOP and relinquish any unused time by resetting the NAVs. NAVs would be reset by sending a CC-RTS with a zero in the Reservation Duration field. If inadequate time has been reserved, the time can be extended by the source node sending another CC-RTS for that channel.

A CC-RTS that is sent to extend the duration of an ongoing TXOP (without a change in the number of frames) will be allowed to contend for the channel at the highest priority; i.e. using the longest AIFR.

The set of permissible data channels is specified by channel assignment. In one implementation, all data channels may be deemed permissible. It is assumed in the description below that any restrictions that may be imposed by channel assignment would be by the source node.

If data channel use is restricted by link (i.e. a source-destination node combination), separate queues would be maintained for different data permissible sets.

When a TXOP that requires forwarding arrives at a node successfully, the node will contend for the control channel to send a CC-RTS. If a data channel that the node is permitted to use (known as a "permissible" data channel) is idle (that is, its NAV=0), and no other CC-RTS is queued at the node, the CC-RTS is transmitted on the control channel within a SIFS idle period following the transmission of the acknowledgment of receipt of the TXOP. If there are other CC-RTSs queued at the node, the CC-RTS will be queued for transmission on the control channel according to a random access method (e.g. EDCA). Control channel access and backoff countdown at the node will occur only while a permissible data channel is 'almost idle' (that is, its NAV will become zero within a time AIFR); if all permissible data channels cease to be almost idle, backoff countdown will stop at the node, and will be resumed when a permissible data channel is about to become idle. The CC-RTS that wins access to the control channel will use the data channel that is idle for the transmission of the associated TXOP (the original data selection may have to change in the CC-RTS).

Prioritization of data traffic transmissions occurs during channel reservation either by control channel access parameters or by time filtering. When using control channel parameters, when contending to get on the control channel, the CC-RTS will employ access parameters (i.e. AIFSN, and other parameters) of a prioritized protocol, like EDCA. When using time filtering, the time when access and count down of the backoff delay is permitted while contending for access to the control channel will be also controlled in ways that depend the priority of the node and/or CC-RTS.

In a network, a reservation request from the source is either granted or denied by the destination, and notice is sent to the source. The response contains the remaining reservation duration in order to notify the neighbors of the destination node. To avoid collisions, each node keeps a NAV for each traffic channel which set according to the received reservation requests and responses. The NAV is the time period the node must refrain from transmitting on the channel. The NAV is updated when a node receives a reservation request or a response to the reservation request.

Referring now to FIG. 1, a first mesh timing diagram 10 is shown. In this diagram, control channel traffic is shown along with a first NAV for a first traffic channel [data1], a second NAV for a second traffic channel [data2], and a third NAV for a third traffic channel [data3]. Also shown is an AIFR time interval, extending from the NAV for data2 back a predetermined amount of time. During this AIFR time interval, a node can request a reservation for a traffic channel, for example by way of the CC-RTS for data2 and the CC-CTS for data2. The request process begins prior to the data2 channel being available.

Figure 2:
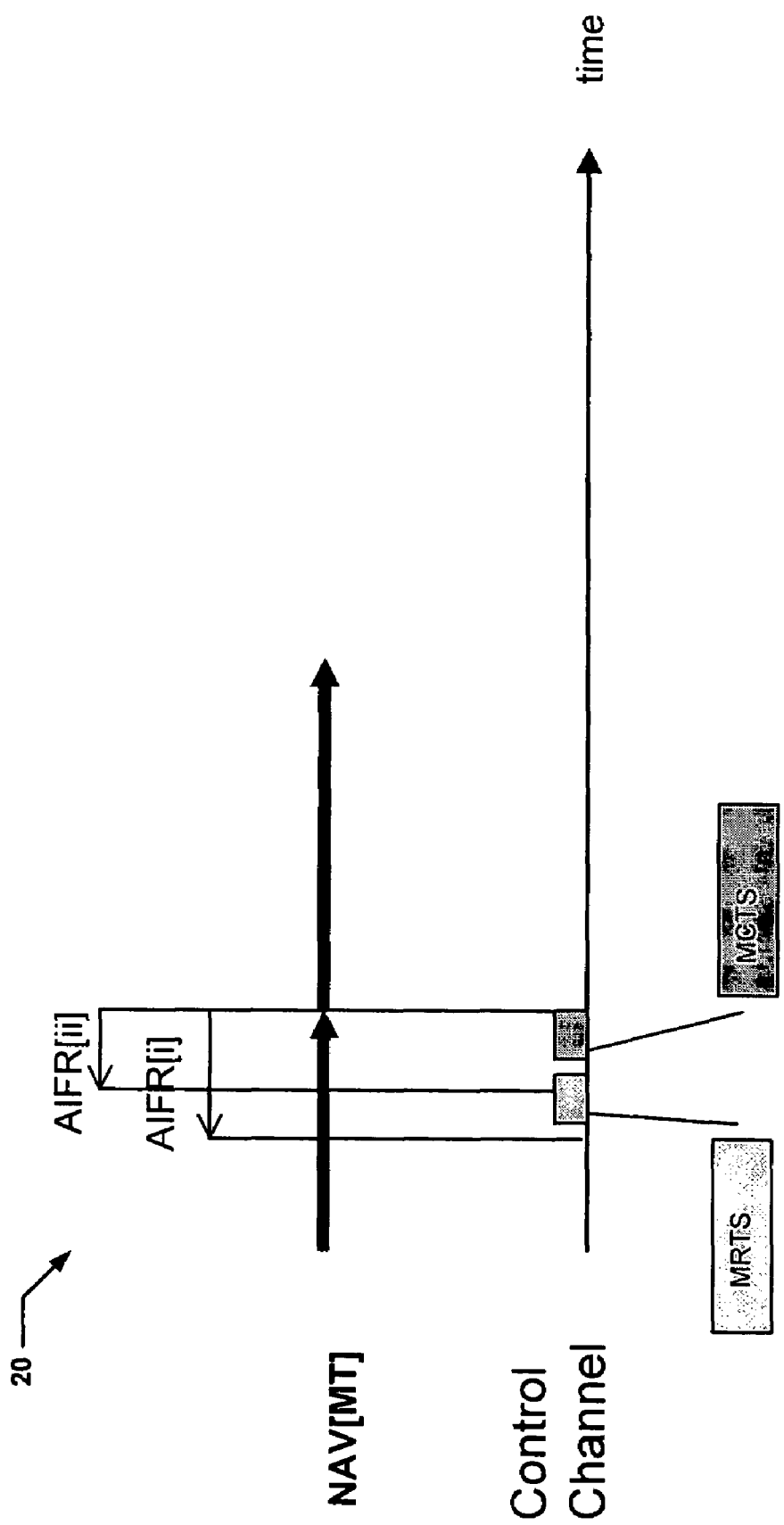
FIG. 2 is timing diagram showing a control channel, a single NAV and multiple AIFRs in accordance with embodiments of the invention.

Referring now to FIG. 2, a second mesh timing diagram 20 is shown. In this diagram, control channel traffic is shown along with a NAV for a traffic channel [data]. Also shown are two different AIFR time intervals AIFR[i] and AIFR[ii]. Both of the AIFR time intervals extend from the NAV for the data back a predetermined amount of time. AIFR[i] has a first predetermined length, associated with a first predetermined time interval. During this AIFR[i] time interval, a node can request a reservation for a traffic channel, for example by way of the CC-RTS and the CC-CTS. The request process begins prior to the data channel being available. AIFR[ii] has a second predetermined length, associated with a second predetermined time interval. During this AIFR[ii] time interval, a node can request a reservation for a traffic channel, for example by way of the CC-RTS and the CC-CTS. The request process begins prior to the data channel being available. AIFR[i] has a longer interval than AIFR[ii], therefore the node associated with AIFR[i] has a higher priority for its data traffic than the node associated with AIFR[ii]. Accordingly, the node associated with AIFR[i] can begin its reservation request process earlier than the node associated with AIFR[ii], therefore providing prioritization to the traffic associated with the longer AIFR time interval. The CC-RTS is shown taking place during the AIFR[i] time interval, but prior to the AIFR[ii] interval. Thus, the node associated with AIFR[i] is able to reserve the data channel ahead of the node associated with AIFR[ii].

Figure 3:
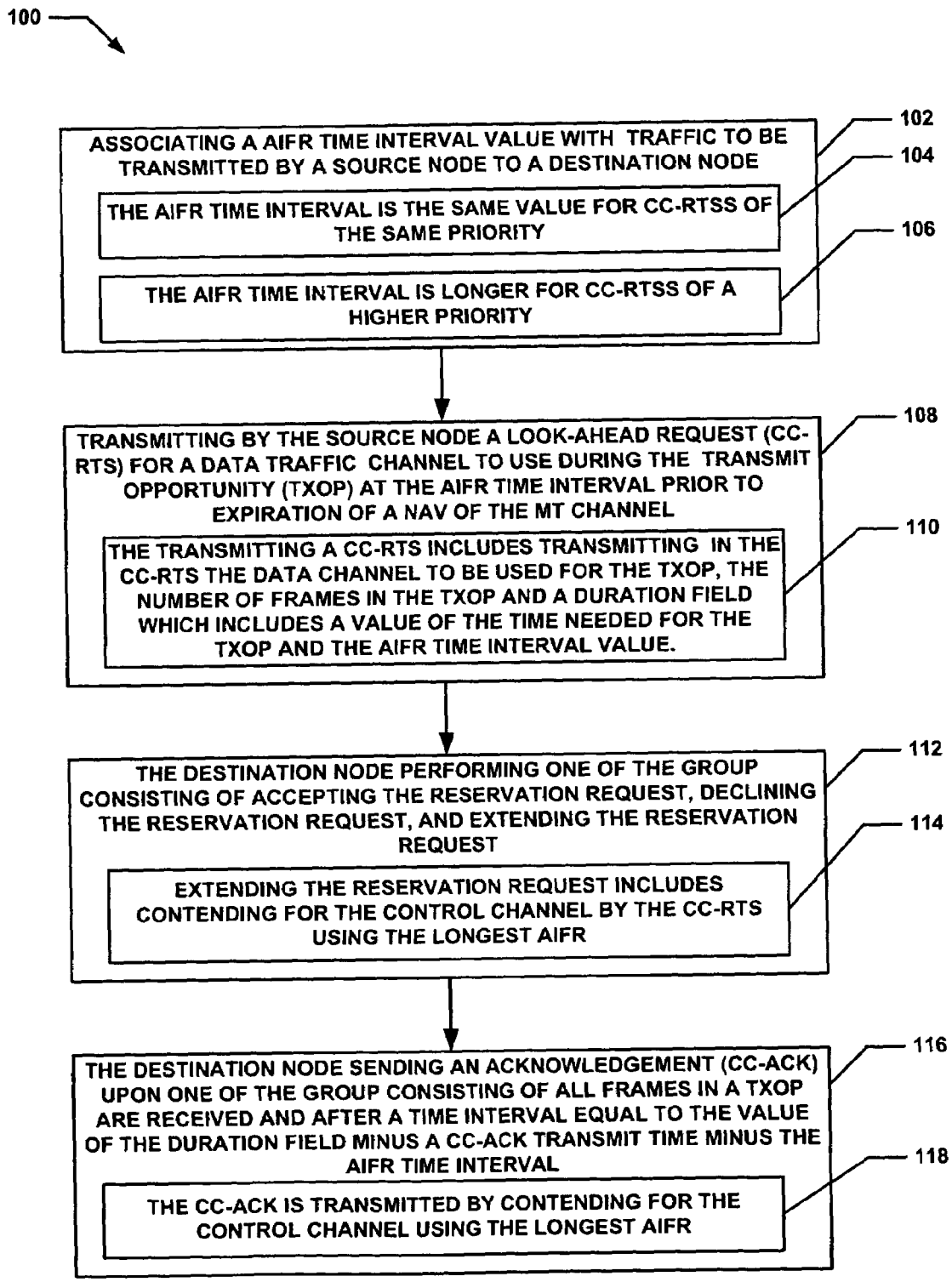
FIG. 3 depicts a block diagram of a particular embodiment of a method of performing prioritization of traffic in a mesh in accordance with embodiments of the invention.

A flow chart of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of providing prioritized access to data channels is shown. The method begins with processing block 102 which discloses associating an AIFR time interval value with traffic to be transmitted by a source node to a destination node. Processing block 104 states the AIFR time interval is the same value for CC-RTSs of the same priority, and processing block 106 recites AIFR time interval is longer for CC-RTSs of a higher priority.

Processing block 108 discloses transmitting by the source node a look-ahead request (CC-RTS) for a data channel to use during the transmit opportunity (TXOP) at the AIFR time interval prior to expiration of a NAV of the data channel. As stated in processing block 110, transmitting a CC-RTS includes transmitting in the CC-RTS the data channel to be used for the TXOP, the number of frames in the TXOP and a Reservation Duration field which includes a value of the time needed for the TXOP and the AIFR time interval value.

Processing continues with processing block 112 which recites the destination node performing one of the group consisting of accepting the reservation request, declining the reservation request, and extending the reservation request. Processing block 114 discloses extending the reservation request includes contending for the control channel by the CC-RTS using the longest AIFR.

Processing block 116 states the destination node sending an acknowledgement (CC-ACK) upon one of the group consisting of all frames in a TXOP are received and after a time interval equal to the value of the Reservation Duration field minus a CC-ACK transmit time minus the AIFR time interval. Processing block 118 recites the CC-ACK is transmitted by contending for the control channel using the longest AIFR.

Figure 4:
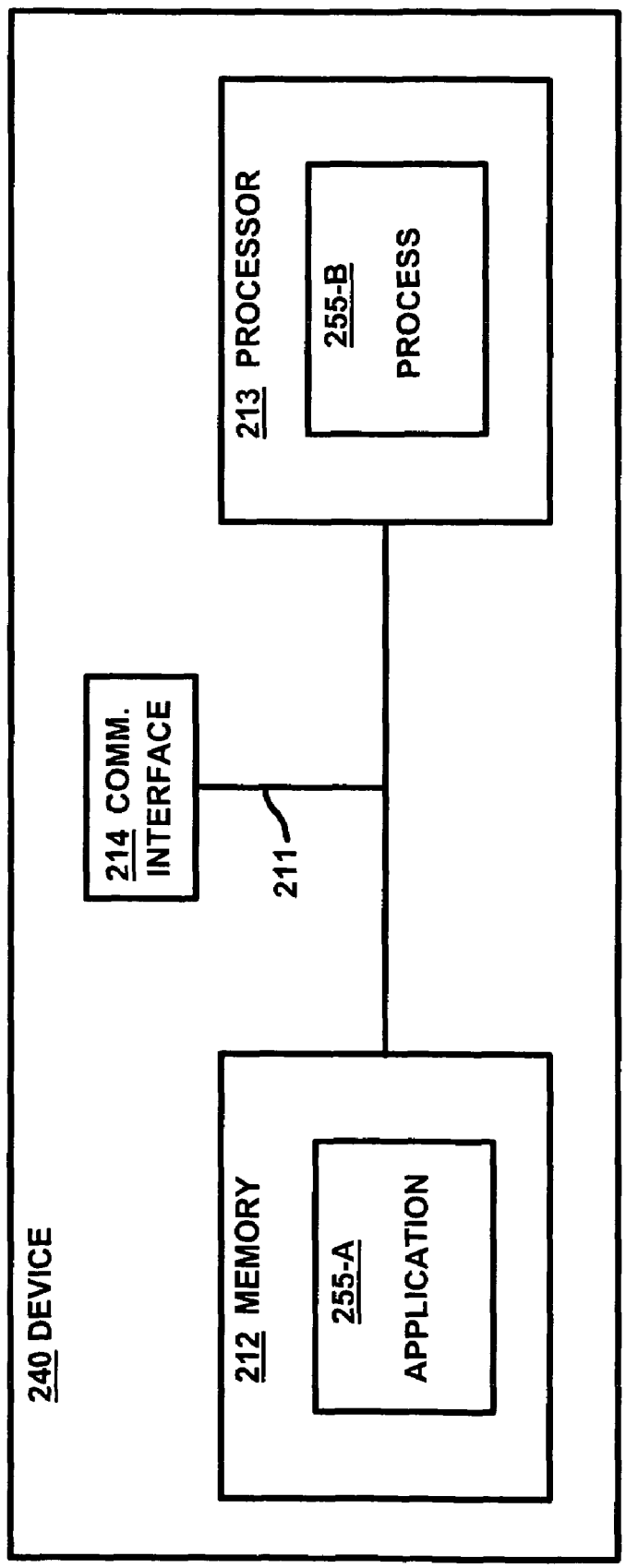
FIG. 4 illustrates an example architecture for a node that performs prioritization of traffic in a mesh in accordance with embodiments of the invention.

FIG. 4 illustrates example architectures of a computer system that is configured as a mesh point or node 240. The node 240 includes an interconnection mechanism 211 that couples a memory system 212, a processor 213, and a communications interface 214. The communications interface 214 allows the computer system 240 to communicate with external devices or systems.

The memory system 212 may be any type of computer readable non-transitory medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the node in order to produce a corresponding process 255-B. In other words, the process 255-B represents one or more portions of the application 255-A performing within or upon the processor 213 in then node.

It is to be understood that embodiments of the invention include the applications (i.e., the un-executed or non-performing logic instructions and/or data) encoded within a computer readable non-transitory medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the node may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable non-transitory medium.

For example, such a computer usable non-transitory medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing prioritization of traffic in a network comprising:
    associating an Advanced Interval For Reservation (AIFR) time interval value with traffic to be transmitted by a source node to a destination node; and
    transmitting by the source node a look-ahead request (CC-RTS) for a data channel to use during a data transmit opportunity (TXOP) at the AIFR time interval after a beginning of a Network Allocation Vector (NAV) and prior to expiration of the NAV of the data channel to give priority to the source node sending the CC-RTS for the data channel, wherein said AIFR time interval is the same value for CC-RTSs of the same priority or wherein said AIFR time interval is longer for CC-RTSs of a higher priority.

2. The method of claim 1 wherein said transmitting a CC-RTS includes transmitting in the CC-RTS the data channel to be used for the TXOP, the number of frames in the TXOP and a Reservation Duration field which includes a value of the time needed for the TXOP and the AIFR time interval value.

3. The method of claim 1 further comprising the destination node performing one of the group consisting of accepting the reservation request, declining the reservation request, and extending the reservation request.

4. The method of claim 3 wherein the extending the reservation request includes contending for the control channel by the CC-RTS using the longest AIFR.

5. The method of claim 1 further comprising the destination node sending an acknowledgement (CC-ACK) upon one of the group consisting of all frames in a TXOP are received, and after a time interval equal to the value of the Reservation Duration field minus a CC-ACK transmit time minus the AIFR time interval.

6. The method of claim 5 wherein said CC-ACK is transmitted by contending for the control channel using the longest AIFR.

7. The method of claim 1 further comprising said source node sending another CC-RTS on the control channel to extend the reservation of the data channel.

8. A source node comprising:
a memory;
a processor; a communications interface;
an interconnection mechanism coupling the memory, the processor and the communications interface; and wherein the memory is encoded with application for providing prioritization of traffic in a network that when performed on the processor, provides a process for processing information, the node capable of performing the operations of:
associating a Advanced Interval For Reservation (AIFR) time interval value with traffic to be transmitted to a destination node; and
transmitting a look-ahead request (CC-RTS) for a data channel to use during a data transmit opportunity (TXOP) at the AIFR time interval after a beginning of a Network Allocation Vector (NAV) and prior to expiration of the NAV of the data channel to give priority to the source node sending the CC-RTS for the data channel, wherein said AIFR time interval is the same value for CC-RTSs of the same priority or wherein said AIFR time interval is longer for CC-RTSs of a higher priority.

9. The source node of claim 8 wherein said transmitting a CC-RTS includes transmitting in the CC-RTS the data channel to be used for the TXOP, the number of frames in the TXOP and a Reservation Duration field which includes a value of the time needed for the TXOP and the AIFR time interval value.

10. A destination node comprising:
a memory;
a processor; a communications interface;
an interconnection mechanism coupling the memory, the processor and the communications interface; and
wherein the memory is encoded with application for providing prioritization of traffic in a network that when performed on the processor, provides a process for processing information, the node capable of performing the operations of:
receiving a look-ahead request (CC-RTS) for a data channel to use during channel a data transmit opportunity (TXOP) at an AIFR time interval after a beginning of a Network Allocation Vector (NAV) and prior to expiration of the NAV of the data channel to give priority to a source node sending the CC-RTS for the data channel, wherein said AIFR time interval is the same value for CC-RTSs of the same priority or wherein said AIFR time interval is longer for CC-RTSs of a higher priority.

11. The destination node of claim 10 further comprising performing one of the group consisting of accepting the reservation request, declining the reservation request, and extending the reservation request.

12. The destination node of claim 10 further comprising sending an acknowledgement (CC-ACK) upon one of the group consisting of all frames in a TXOP are received, and after a time interval equal to the value of the Reservation Duration field minus a CC-ACK transmit time minus the AIFR time interval.

13. The destination node of claim 12 wherein said CC-ACK is transmitted by contending for the control channel using the longest AIFR.

14. The destination node of claim 10 wherein said destination node extends a reservation request by contending for the control channel by the CC-RTS using the longest AIFR.

15. A computer readable non-transitory storage medium having computer readable code thereon including instructions in which a computer system performs operations for providing prioritization of traffic in a WLAN or wireless mesh, the medium comprising: instructions for associating a Advanced Interval For Reservation (AIFR) time interval value with traffic to be transmitted by a source node to a destination node; and instructions for transmitting by the source node a look-ahead request (CC-RTS) for a data channel to use during a data transmit opportunity (TXOP) at the AIFR time interval after a beginning of a Network Allocation Vector (NAV) and prior to expiration of the NAV of the data channel to give priority to the source node sending the CC-RTS for the data channel; wherein said AIFR time interval is the same value for CC-RTSs of the same priority or wherein said AIFR time interval is longer for CC-RTSs of a higher priority.

16. The computer readable medium of claim 15 wherein said instructions for transmitting a CC-RTS includes instructions for transmitting in the CC-RTS the data channel to be used for the TXOP, the number of frames in the TXOP and a Reservation Duration field which includes a value of the time needed for the TXOP and the AIFR time interval value.

17. The computer readable medium of claim 15 further comprising instructions for the destination node performing one of the group consisting of accepting the reservation request, declining the reservation request, and extending the reservation request.

18. The computer readable medium of claim 17 wherein the extending the reservation request includes contending for the control channel by the CC-RTS using the longest AIFR.

19. The computer readable medium of claim 15 further comprising instructions for the destination node sending an acknowledgement (CC-ACK) upon one of the group consisting of all frames in a TXOP are received, and after a time interval equal to the value of the Reservation Duration field minus a CC-ACK transmit time minus the AIFR time interval.

20. The computer readable medium of claim 19 wherein said CC-ACK is transmitted by contending for the control channel using the longest AIFR.

* * * * *